United States Patent [19]
Chojnacki et al.

[11] Patent Number: 5,883,142
[45] Date of Patent: Mar. 16, 1999

[54] SILICONE SURFACTANTS FOR RIGID POLYURETHANE FOAM MADE WITH THIRD GENERATION BLOWING AGENTS

[75] Inventors: Jennifer Ann Chojnacki, Allentown; Karla Asuncion Sabram, Macungie, both of Pa.

[73] Assignee: Air Products and Chemicals, Inc., Allentown, Pa.

[21] Appl. No.: 976,979

[22] Filed: Nov. 25, 1997

Related U.S. Application Data

[63] Continuation-in-part of Ser. No. 853,136, May 8, 1997, abandoned.

[51] Int. Cl.$^6$ ........................................ C08J 9/14
[52] U.S. Cl. ............................ 521/112; 516/8; 521/131
[58] Field of Search ........................ 521/112, 131; 252/350

[56] References Cited

U.S. PATENT DOCUMENTS

| | | | |
|---|---|---|---|
| 4,304,872 | 12/1981 | Tenhagen | 521/112 X |
| 4,751,251 | 6/1988 | Thornsberry | 521/112 |
| 4,997,706 | 3/1991 | Smits et al. | 428/304.4 |
| 5,308,881 | 5/1994 | Londrigan et al. | 521/112 |
| 5,426,127 | 6/1995 | Doerge | 521/131 |
| 5,432,206 | 7/1995 | Stanga et al. | 521/110 |
| 5,461,084 | 10/1995 | Doerge | 521/167 |
| 5,525,640 | 6/1996 | Gerkin et al. | 521/112 |
| 5,686,499 | 11/1997 | Fishback | 521/112 |

FOREIGN PATENT DOCUMENTS

| | | |
|---|---|---|
| 0142689 | 5/1985 | European Pat. Off. . |
| 0533202 | 3/1993 | European Pat. Off. . |
| 0570174 | 11/1993 | European Pat. Off. . |
| 0770642 | 5/1997 | European Pat. Off. . |

OTHER PUBLICATIONS

Barthelemy, P. P., and Leroy, A., "Latest Results in the Development of Next Generation HFC Blowing Agents" Polyurethane 1995, Sep. 26–29, 1995, pp. 26–33.

Bogdan, M. C., Williams, D. J., et al. "Status Report on the Development of HFC–245fa as a Blowing Agent" Polyurethane EXPO 1996 pp. 394–403.

Bodnar, T. W., Koch, J. J.; and Thornsberry, J. D., "New Surfactant Technology for HCFC–123 and HCFC–141b Blown Rigid Foam Systems", Polyurethane World Congress 1991, pp. 24–26.

*Primary Examiner*—Richard D. Lovering
*Attorney, Agent, or Firm*—Michael Leach

[57] ABSTRACT

A method for making a rigid polyurethane foam by reacting a polyisocyanate and a polyol in the presence of a urethane catalyst, a blowing agent and a silicone surfactant characterized by employing as a blowing agent a C1–C4 HFC or HCFC, preferably HFC-245fa, and as the silicone surfactant a polyether-polysiloxane copolymer having a total surfactant molecular weight of 12,000 to 100,000 g/mole, a wt % siloxane in the surfactant of 10 to 40 wt %, a molecular weight of the polyether portion of 1200 to 6,000 g/mole, and a wt % of ethylene oxide in the polyether portion of 30–100 wt %.

20 Claims, No Drawings

SILICONE SURFACTANTS FOR RIGID POLYURETHANE FOAM MADE WITH THIRD GENERATION BLOWING AGENTS

CROSS REFERENCE TO RELATED APPLICATION

This application is a continuation-in-part of application Ser. No. 08/853,136 filed 8 May 1997 and now abandoned.

FIELD OF THE INVENTION

The present invention relates to cell stabilizers for making polyurethane foams and, more particularly, relates to silicone surfactant cell stabilizers for making rigid polyurethane foams.

BACKGROUND OF THE INVENTION

Due to changing government requirements, specifically the Montreal Protocol, which regulate the use of ozone-depleting materials, the primary blowing agent currently being used by the industry (in the United States) for applications where good insulating properties are needed is HCFC-141b. However, the Montreal Protocol dictates that this material may not be used in the United States after 1 Jan. 2003. (HCFC-141b must be phased out of Japan by 2004; phase out dates for other countries vary from 2010–2040.) Potential replacements, the 'third generation' blowing agents, are partially hydrogenated fluorocarbons (HFCs) and some hydrochlorofluorocarbons (HCFCs) and include compounds such as HFC-134a, HFC-236ea, HFC-245fa, HFC-365mfc, and HCFC-22. However, these may not allow for optimal performance in current foam formulations.

For foams used in various market segments, for example the appliance and water heater markets, the blowing agent must produce rigid foams with good insulating values, i.e., low thermal conductivities (low k-factors). Water heaters and refrigerators both must conform to energy requirements established by the U.S. Department of Energy. Additionally, it is anticipated that these requirements will become even more stringent in the future.

As a direct replacement for HCFC-141b in an appliance foam formulation, third generation blowing agents yield rigid foam in which there is a small to moderate increase in k-factors. The choice of silicone surfactant in the formulation has a direct impact upon the magnitude of this increase in k-factor. That is, the proper choice of surfactant can minimize the potential loss in insulating capability of the foam when converting to a third generation blowing agent.

A variety of papers have been published which discuss the general topic of third generation HFC/HCFC blowing agents and their inferior insulating capability when compared with CFC-11 or HCFC-141b. One, for example, is Barthlemey, P. P.; Leroy, A.; *POLYURETHANE* 1995 *Proceedings of the Polyurethanes 1995 Conference*, September, 1995, pp. 26–33.

Bogdan, M. C.; Williams, D. J.; Logsdon, P. B.; Parker, R. C.; Proceedings of Polyurethanes EXPO '96, October, 1996, pp. 394–403. This paper discusses the importance of surfactant choice for optimization of k-factor in rigid polyurethane foam. It lists several surfactants which have been tested in foams made with HFC-245fa as the blowing agent. Furthermore, it concludes that Th. Goldschmidt's B8404 and B8462 and OSi's L-6900 are the best performing silicone surfactants identified to date for improving the foam quality in HFC-245fa-blown foam, including the k-factor and % closed cell content. These polyether-polysiloxane copolymer surfactants each have a calculated total surfactant molecular weight, based on NMR structural analysis, of <10,000 g/mole.

Bodnar, T. W.; Koch, J. J.; Thornsberry, J. D., "New Surfactant Technology for HCFC-123 and HCFC-141b Blown Rigid Foam Systems", Polyurethane World Congress 1991, pp. 24–26 discusses surfactants to optimize rigid foam properties using traditional rigid foam surfactants.

U.S. Pat. Nos. 5,461,084 and 5,426,127 teach the use of HFC blowing agents and B-8426 silicone surfactant in rigid polyurethane foam for low k-factor and good physical properties.

U.S. Pat. No. 4,997,706 teaches the use of C2–C6 polyfluorocarbon compounds containing no Cl or Br atoms as physical blowing agents for rigid closed cell polymer foams. The benefit is that the loss in thermal insulation performance with time compared to foams made in absence of these compounds is reduced.

U.S. Pat. No. 5,432,206 discloses silicone surfactants for making stable polyurethane foam.

U.S. Pat No. 5,525,640 teaches the use of certain surfactants for polyurethane foam made with an inert gas blowing agent.

BRIEF SUMMARY OF THE INVENTION

The present invention provides a silicone surfactant (polyether-polysiloxane copolymer) for stabilizing the cell formation in the preparation of a rigid polyurethane and/or polyisocyanurate foam by the reaction of a polyisocyanate and a polyol in the presence of a urethane catalyst and a blowing agent containing at least one hydrogen atom and at least one fluorine atom, namely a C1–C4 hydrofluorocarbon (HFC) or hydrochlorofluorocarbon (HCFC), having a molecular weight of 50 to 150 g/mole, and a boiling point of −60° to +50° C. The silicone surfactant comprises a polyether-polysiloxane copolymer represented by the formula:

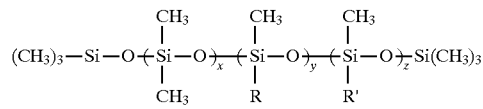

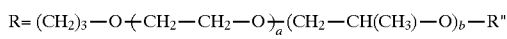

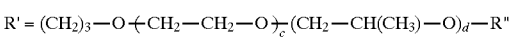

where R" is H, CH3, or C(O)CH3; x is 50–200; y+z is 3–30; and x/(y+z) is 7–20; and the total surfactant molecular weight, based on the formula, is 12,000–100,000 g/mole, the wt % siloxane in the surfactant is 10–40 wt %, the blend average molecular weight (BAMW) of the polyether portion is 1200–6,000 g/mole, and the wt % of ethylene oxide in the polyether portion is 30–100 wt %.

Advantageously, in the production of rigid polyurethane foams using a third generation blowing agent, the silicone surfactants provide for foams with higher closed cell content and lower k-factors than silicone surfactants traditionally used in the rigid polyurethane foam industry.

In this specification and the claims, the term "polyurethane" is intended to mean polyurethane and/or polyisocyanurate as is understood in the art. Thus a rigid polyurethane foam can be a rigid polyurethane and/or polyisocyanurate foam.

DETAILED DESCRIPTION OF THE INVENTION

The process according to the invention can easily be carried out by conventional means for making rigid polyurethane foam, excepting that the general preparation of rigid polyurethane foam using a C1–4 HFC or HCFC is carried out using the polyether-polysiloxane copolymer according to the invention as the cell stabilizer.

The polyurethane rigid products are prepared using any suitable organic polyisocyanates well known in the art for making rigid polyurethane foam including, for example, hexamethylene diisocyanate, isophorone diisocyanate, phenylene diisocyanate, toluene diisocyanate ("TDI") and 4,4'-diphenylmethane diisocyanate ("MDI"). Especially suitable are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Other suitable isocyanates are the 2,4- and 2,6-TDI's individually or together as their commercially available mixtures. Also suitable are "prepolymers" of these polyisocyanates comprising a partially prereacted mixture of a polyisocyanate and a polyether or polyester polyol. Preferably the above polyisocyanates are used in an isocyanate index range of 80 to 400.

Suitable polyols are those polyols typically used in the art for making rigid polyurethane foam including the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, sugars, such as sucrose, and like low molecular weight polyols. Also useful are amine polyether polyols which can be prepared by reacting an amine, such as ethylenediamine, diethylenetriamine, tolylenediamine, diphenylmethanediamine, triethanolamine or the like, with ethylene oxide or propylene oxide.

In the practice of this invention, a single high molecular weight polyether polyol may be used. Also, mixtures of high molecular weight polyether polyols such as mixtures of different multifunctional materials and/or different molecular weight or different chemical composition materials may be used.

Useful polyester polyols include those produced by reacting a dicarboxylic acid with an excess of a diol, for example, adipic acid or phthalic acid/anhydride with ethylene glycol or butanediol, or reacting a lactone with an excess of a diol such as caprolactone with propylene glycol.

The catalyst composition may be any catalyst well known in the urethane art such as tertiary amines, organotin and carboxylate urethane catalysts (gelling and/or blowing). Typical examples of useful catalysts are amine catalysts such as triethylenediamine, dimethylcyclohexylamine, tetramethylhexanediamie, bis(dimethylaminioethyl)ether, tri(dimethylaminopropyl)hexahydrotriamine, 1-isobutyl-2-methylimidazole, 1,2-dimethylimidazole, dimethylaminoethanol, diethylaminoethanol, pentamethyldiethylenetriamine, pentamethyldipropylenetriamine, methyl morpholine, ethyl morpholine, quaternary ammonium salts, salts of an organic acid and tin catalysts such as dibutyltin dilaurate and the like.

A catalytically effective amount of the catalyst composition is used in the polyurethane formulation. More specifically, suitable amounts of the catalyst composition may range from about 0.01 to 10 parts by weight per 100 parts polyol (0.01 to 10 pphp) in the polyurethane formulation, preferably 0.5 to 4 pphp.

The third generation blowing agents used in the present invention for making rigid foams comprise a C1–C4 HFC or HCFC with a molecular weight of 50 to 170 g/mole, a boiling point of −60° to +50° C., and preferably an Ozone Depleting Potential (ODP) of <0.10, ODP as described by: Synthesis of the Reports of the Ozone Scientific Assessment Panel, Environmental Effects Assessment Panel Technology and Economic Assessment Panel, Prepared by the Assessment Chairs for the Parties to the Montreal Protocol, November 1991. HFCs and HCFCs meeting this criteria include HFC-134a, HFC-236ea, HFC-365mfc, HCFC-22 and preferably HFC-245fa. Water may be included in the formulation at 0 to 4 pphp. Other blowing agents which may optionally be used in combination with the defined C1–C4 HFC or HCFC include CFCs, other HCFCs, other HFCs, pentanes and the like.

The silicone surfactant cell stabilizer in an amount of 0.5 to 3.5 pphp, preferably 1.5 to 2.5 pphp, may be any polyether-polysiloxane copolymer of the following structure

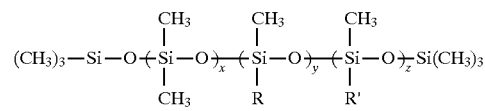

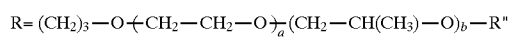

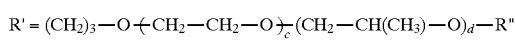

where the calculated total surfactant molecular weight, based on the structure, is 12,000 to 100,000 g/mole, preferably 15,000 to 30,000 g/mole; the wt % siloxane in the surfactant is 10 to 40 wt %, preferably 25 to 35 wt %; the BAMW of the polyether portion is 1200 to 6000 g/mole, preferably 1200 to 3000 g/mole; and the wt % ethylene-oxide in the polyether portion is 30 to 100 wt %; preferably 30 to 60 wt %. In addition, R" can be H, $CH_3$, or $C(O)CH_3$ and x is 50 to 200, preferably 50 to 170, y+z is 3 to 30, preferably 5 to 25; and x/(y+z) is 7 to 20, preferably 7 to 15. These polyether-polysiloxane copolymers can be used as the sole surfactant or in combination with another silicone surfactant which falls outside of the range described here.

The prior art, especially the polyurethane foam art, is replete with examples of polyether-polysiloxane copolymers. The methods and materials used in making and capping the various copolymers are well known in the art.

The usual procedures for manufacturing such materials results in a molecule in which one end of the polyether (polyoxyalkylene) is capped with an unsaturated group such as allyloxy in order to be able to react with methylhydrogenpolysiloxanes to create the polyether-polysiloxane copolymers. This is possible through hydrosilylation using noble metal catalysts, wherein the polysiloxanes have ascertain number of methylhydrogensiloxane units in their molecules that react with the unsaturated groups of the polyethers to form Si-C bonds. Generally, the polyether copolymers can be capped before the hydrosilylation, or they can be capped after the hydrosilylation. Whatever the case, the normal preparative method for the unsaturated polyether copolymers is to coreact, for example, allyl alcohol with ethylene oxide and then react this polymer with propylene oxide such that the polyether copolymer molecule ends up with primarily secondary alcohol groups at its non-unsaturated end. In other methods, a random copolymer can be formed by reacting ethylene oxide, propylene oxide and allyl alcohol to provide a material having large numbers of carbinols on the secondary carbon atoms of the propylene glycol that is formed. So that the polyether materials could be reacted into polysiloxanes, and eventually participate in, for example polyurethane foam production as surfactants, the carbinols are quite often endblocked, a common endblocker being acyloxy.

Procedures for synthesizing nonhydrolyzable silicone surfactants having polyether pendant groups are well known. Representative disclosures are provided in U.S. Pat. Nos. 4,147,847 and; 4,855,379 which are hereby incorporated by reference.

Other typical agents which may be used in the polyurethane rigid foam formulations include flame retardants and chain extenders such as ethylene glycol and butanediol.

A general polyurethane rigid foam formulation having a 1.5–2.5 lb/ft$^3$ (24–40 kg/m$^3$) density (e.g., appliance foam) containing a silicone surfactant such as the polyetherpolysiloxane copolymer according to the invention and a third generation blowing agent, for example HFC-245fa, would comprise the following components in parts by weight (pbw):

| Rigid Foam Formulation | pbw |
|---|---|
| Polyol | 100 |
| Silicone Surfactant | 1–3 |
| Blowing Agent | 20–40 |
| Water | 0–3 |
| Catalyst | 0.5–3 |
| Isocyanate Index | 80–400 |

The following examples used the rigid polyurethane foam formulation of Table 1.

TABLE 1

| Component | Parts by Weight |
|---|---|
| Polyol[a] | 100 |
| Amine Catalysts | 2.6 |
| Water | 2.0 |
| HFC-245fa[b] | 34.2 |
| Polymeric MDI | NCO Index = 115 |

[a]Sucrose initiated polyether polyol, OH number = 360.
[b]1,1,1,3,3-pentafluoropropane

EXAMPLE 1

The ingredients in Table 1 were combined and incubated at 10° C. until the mixture had equilibrated to temperature. The resin was weighed into a paper cup and Surfactant A was added in an amount equal to 3.0 parts by weight per 100 parts of polyol. Polymeric MDI at 23° C. was added in an amount such that the isocyanate (NCO) index was 115. The mixture was stirred with a high speed mixer for 8 seconds and poured into a 12×12×2 inch (30.5×30.5×5.1 cm) mold which was heated to 49° C. Enough of the foaming mixture was added to the mold to yield a plaque which was 5% overpacked. The foam plaque was removed from the mold after 4 minutes and aged at 23° C. for 18 to 24 hours. An 8×8×1 inch (20.3×20.3×2.54 cm) portion was cut from the center of the plaque and tested in a Lasercomp Fox-200 heat flow meter. After heat flow (k-factor) measurements were made, 1×1×1 inch (2.54×2.54×2.54 cm) samples were cut from the foam and tested by Quantachrome Pycnometry for % closed cell content.

EXAMPLE 2

The procedure of Example 1 was followed, except that Surfactant B was used in place of Surfactant A.

EXAMPLE 3

The procedure of Example 1 was followed, except that Surfactant C was used in place of Surfactant A.

EXAMPLE 4

The procedure of Example 1 was followed, except that Surfactant D was used in place of Surfactant A.

EXAMPLE 5

The procedure of Example 1 was followed except that 1.5 parts by weight of Surfactant B and 1.5 parts by weight of Surfactant C were added to the resin mixture in place of 3.0 parts by weight Surfactant A.

EXAMPLE 6

The procedure of Example 1 was followed except that Goldschmidt B8404 was used in place of Surfactant A.

EXAMPLE 7

The procedure of Example 1 was utilized except that OSi Specialty Niax L-6900 silicone surfactant was used in place of Surfactant A.

TABLE 2

| Ex | Surfactant | Surfactant mol wt | % Siloxane | Polyether BAMW | % EO in Polyether | x/(y+ z) | k-factor[c] | % Closed Cell |
|---|---|---|---|---|---|---|---|---|
| 1 | A | 45 600 | 30.2 | 1368.4 | 50 | 7.4 | 0.1469 | 82.5 |
| 2 | B | 28 200 | 31.2 | 1938.5 | 41 | 10.8 | 0.1447 | 85.4 |
| 3 | C | 6800 | 35.2 | 730.9 | 60 | 4.2 | 0.1555 | 74.9 |
| 4 | D | 3200 | 32.2 | 586.7 | 90 | 2.4 | 0.1850 | 47.8 |
| 5 | B + C | — | — | — | — | — | 0.1481 | 81.1 |
| 6 | B8404[a] | <10 000 | — | — | — | — | 0.1570 | 76.6 |
| 7 | L-6900[b] | <10 000 | — | — | — | — | 0.1501 | 78.4 |

[a]Th. Goldschmidt AG — calculated mol wt
[b]OSi Specialty — calculated mol wt
[c]Btu · in/ft$^2$ · hr °F.

Table 2 presents the results of Examples 1–7. It can be seen from the data that Surfactants A and B provided for notably lower k-factors and higher % closed cell contents than Surfactants C, D, B8404, and L-6900. Surfactants C and D as well as B8404 and L-6900 are all representative of what is used currently in the rigid foam industry. Furthermore, Surfactant B used in conjunction with Surfactant C also yielded foam with lower k-factor and higher % closed cell content than surfactant C alone or the other, typical rigid foam surfactants. This data clearly demonstrates that the silicone surfactants according to the invention yield foams with a higher % closed cell content and a lower k-factor than those typically used in the industry.

STATEMENT OF INDUSTRIAL APPLICATION

The present invention provides polyether-polysiloxane copolymers for making rigid polyurethane foam.

We claim:

1. In a method for making a rigid polyurethane foam by reacting a polyisocyanate and a polyol in the presence of a urethane catalyst, a blowing agent, optionally water, and a silicone surfactant, the improvement which comprises employing as a blowing agent a C1–C4 HFC having a molecular weight of 50 to 170 g/mole and a boiling point of −60° to +50° C., or HCFC-22 and as the silicone surfactant a polyether-polysiloxane copolymer represented by the following formula:

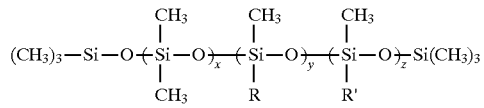

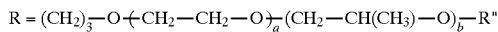

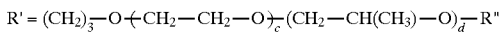

where R" is H, CH3, or C(O)CH3; x is 50–200; y+z is 3–30; and x/(y+z) is 7–20; the total surfactant molecular weight is 12,000–100,000 g/mole, the wt % siloxane in the surfactant is 10–40 wt %, the blend average molecular weight of the polyether portion is 1200–6000 g/mole, and the wt % of ethylene oxide in the polyether portion is 30–100 wt %.

2. The method of claim 1 in which the blowing agent is HFC-134a, HFC-236ea, HFC-365mfc, HCFC-22, or HFC-245fa.

3. The method of claim 1 in which the blowing agent is HFC-245fa.

4. The method of claim 1 in which the blowing agent also contains a CFC, another HCFC, another HFC or a pentane.

5. In a method for making a rigid polyurethane foam by reacting a polyisocyanate and a polyol in the presence of a urethane catalyst, a blowing agent, optionally water, and a silicone surfactant, the improvement which comprises employing as a blowing agent a C1–C4 HFC or HCFC having a molecular weight of 50 to 170 g/mole, a boiling point of −60° to +50° C., and an Ozone Depleting Potential of <0.10 and as the silicone surfactant a polyether-polysiloxane copolymer represented by the following formula:

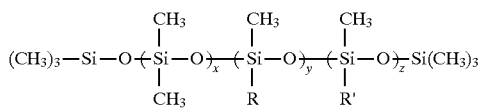

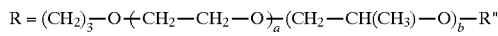

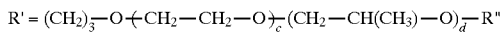

where R" is H, CH3, or C(O)CH3; x is 50–200; y+z is 3–30; and x/(y+z) is 7–20; the total surfactant molecular weight is 12,000–100,000 g/mole, the wt % siloxane in the surfactant is 10–40 wt %, the blend average molecular weight of the polyether portion is 1200–6000 g/mole, and the wt % of ethylene oxide in the polyether portion is 30–100 wt %.

6. In a method for making a rigid polyurethane foam by reacting a polyisocyanate and a polyol in the presence of a urethane catalyst, a blowing agent, optionally water, and a silicone surfactant, the improvement which comprises employing as the blowing agent a C1–C4 HFC having a molecular weight of 50 to 170 g/mole and a boiling point of −60° to +50° C., or HCFC-22 and as the silicone surfactant at 0.5 to 3.5 pphp a polyether-polysiloxane copolymer represented by the following formula:

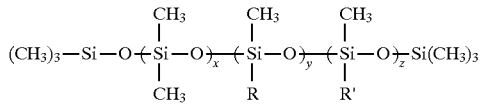

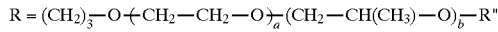

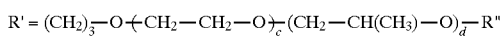

where R" is H, CH3, or C(O)CH3; x is 50–200; y+z is 3–30; and x/(y+) is 7–20; the total surfactant molecular weight is 15,000–30,000 g/mole, the wt % siloxane in the surfactant is 25–35 wt %, the blend average molecular weight of the polyether portion is 1200–3000 g/mole, and the wt % of ethylene oxide in the polyether portion is 30–60 wt %.

7. The method of claim 6 in which the blowing agent is HFC-134a, HFC-236ea, HFC-365mfc, HCFC-22, or HFC-245fa.

8. The method of claim 6 in which the blowing agent is HFC-245fa.

9. The method of claim 8 in which the blowing agent also contains a CFC, another HCFC, another HFC or a pentane.

10. The method of claim 6 in which the blowing agent also contains a CFC, another HCFC, another HFC or a pentane.

11. In a method for making a rigid polyurethane foam by reacting a polyisocyanate and a polyol in the presence of a urethane catalyst, a blowing agent, optionally water, and a silicone surfactant, the improvement which comprises employing as the blowing agent a C1–C4 HFC or HCFC having a molecular weight of 50 to 170 g/mole, a boiling point of −60° to +50° C., and an Ozone Depleting Potential of <0.10 and as the silicone surfactant at 0.5 to 3.5 pphp a polyether-polysiloxane copolymer represented by the following formula:

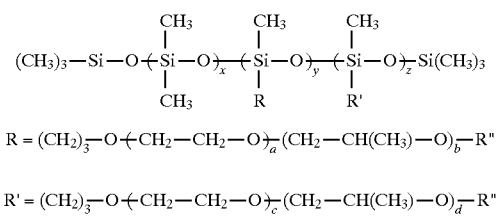

where R" is H, CH3, or C(O)CH3; x is 50–200; y+z is 3–30; and x/(y+z) is 7–20; the total surfactant molecular weight is 15,000–30,000 g/mole, the wt % siloxane in the surfactant is 25–35 wt %, the blend average molecular weight of the polyether portion is 1200–3000 g/mole, and the wt % of ethylene oxide in the polyether portion is 30–60 wt %.

12. The method of claim 11 in which the blowing agent is HFC-134a, HFC-236ea, HFC-365mfc, HCFC-22, or HFC-245fa and optionally contains CFC, another HCFC, another HFC or a pentane.

13. A rigid polyurethane foam composition comprising the following components in parts by weight (pbw):

| Rigid Foam Formulation | pbw |
|---|---|
| Polyol | 100 |
| Silicone Surfactant | 1–3 |
| Blowing Agent | 20–40 |
| Water | 0–3 |
| Catalyst | 0.5–3 |
| Isocyanate Index | 80–400 | where the blowing agent is a C1–C4 HFC or HCFC having a molecular weight of 50 to 170 g/mole, a boiling point of −60° to +50° C., and an Ozone Depleting Potential of <0.10 and the silicone surfactant is a polyether-polysiloxane copolymer represented by the following formula:

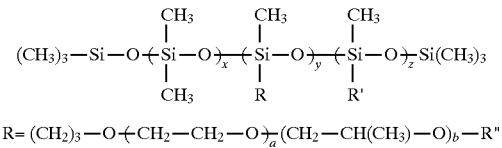

where R" is H, CH3, or C(O)CH3; x is 50–200; y+z is 3–30; and x/(y+z) is 7–20; the total surfactant molecular weight is 12,000–100,000 g/mole, the wt % siloxane in the surfactant is 10–40 wt %, the blend average molecular weight of the polyether portion is 1200–6000 g/mole, and the wt % of ethylene oxide in the polyether portion is 30–100 wt %.

14. The composition of claim 13 in which the blowing agent is HFC-134a, HFC-236ea, HFC-365mfc, HCFC-22, or HFC-245fa.

15. The composition of claim 13 in which the blowing agent is HFC-245fa.

16. The composition of claim 13 in which the blowing agent also contains a CFC, another HCFC, another HFC or a pentane.

17. The composition of claim 13 in which the blowing agent which is HFC-134a, HFC-236ea, HFC-365mfc, HCFC-22, or HFC-245fa and the silicone surfactant is a polyether-polysiloxane copolymer represented by the following formula:

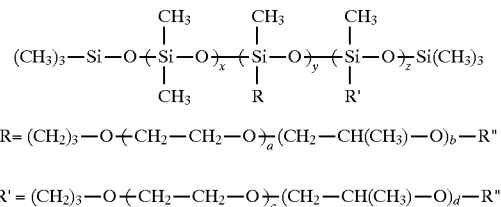

where R" is H, CH3, or C(O)CH3; x is 50–200; y+z is 3–30; and x/(y+z) is 7–20; the total surfactant molecular weight is 15,000–30,000 g/mole, the wt % siloxane in the surfactant is 25–35 wt %, the blend average molecular weight of the polyether portion is 1200–3000 g/mole, and the wt % of ethylene oxide in the polyether portion is 30–60 wt %.

18. The composition of claim 17 in which the blowing agent is HFC-245fa.

19. The composition of claim 18 in which the blowing agent also contains a CFC, another HCFC, another HFC or a pentane.

20. The composition of claim 17 in which the blowing agent also contains a CFC, another HCFC, another HFC or a pentane.

* * * * *

UNITED STATES PATENT AND TRADEMARK OFFICE
CERTIFICATE OF CORRECTION

PATENT NO. : 5,883,142
DATED : 16 March 1999
INVENTOR(S) : Jennifer Ann Chojnacki and Karla Asuncion Sabram It is certified that error appears in the above-identified patent and that said Letters Patent is hereby corrected as shown below:

Column 8, line 42, after "and x/(y+" insert "z".

Signed and Sealed this

Twenty-seventh Day of July, 1999

Attest:

Q. TODD DICKINSON

*Attesting Officer*      *Acting Commissioner of Patents and Trademarks*